(No Model.)
M. G. CRANE.
BICYCLE.
No. 258,559. Patented May 30, 1882.
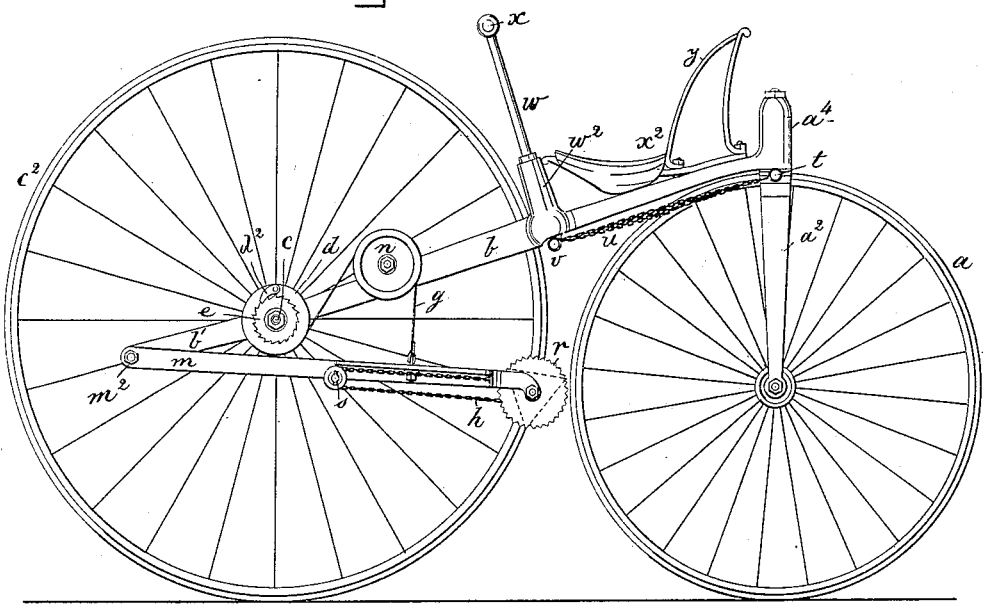
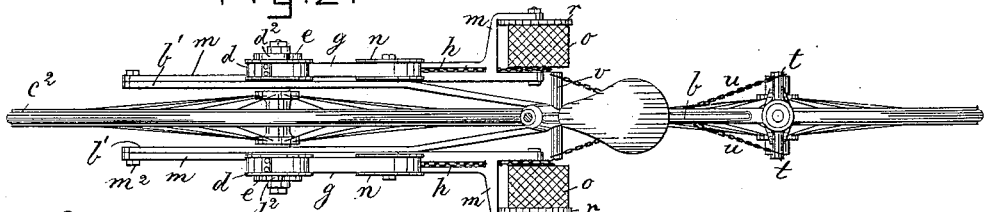
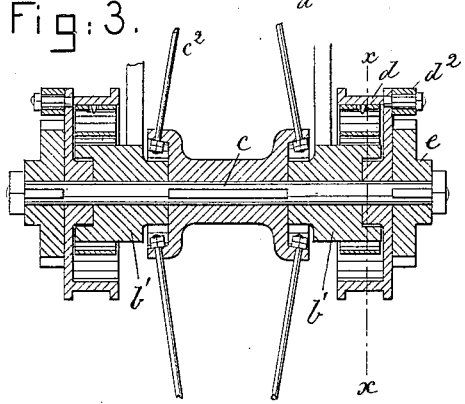
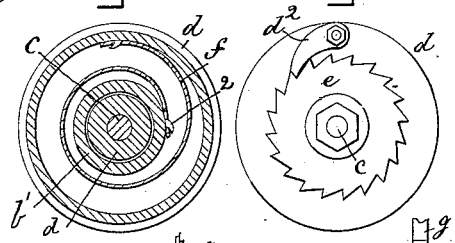
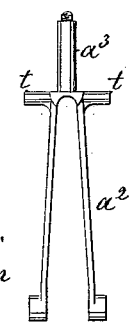
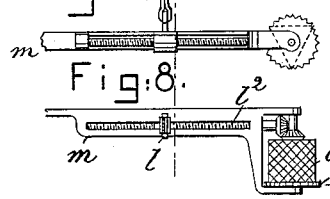
Witnesses
L. F. Connor,
John F. C. Brinkert
Inventor.
Moses G. Crane,
by Crosby & Gregory
Attys.

UNITED STATES PATENT OFFICE.

MOSES G. CRANE, OF NEWTON, MASSACHUSETTS.

BICYCLE.

SPECIFICATION forming part of Letters Patent No. 258,559, dated May 30, 1882.

Application filed October 6, 1881. (No model.)

*To all whom it may concern:*

Be it known that I, MOSES G. CRANE, of Newton, county of Middlesex, State of Massachusetts, have invented an Improvement in Bicycles, of which the following description, in connection with the accompanying drawings, is a specification.

In this my improved bicycle the rider's seat is supported at the rear of the largest or front wheel and between it and the smaller or rear wheel, which has its axle in a fork pivoted in a bearing at the rear end of the backbone, the said rear wheel being made available as the steering-wheel, and being connected by a suitable chain or cord, or link, with the steering-handle located in front of the rider's seat. The main or front wheel, having the bearings for its axle fixed to the backbone near its front end, is driven by pawl-and-ratchet or friction-clutch mechanism each side of it, the pawl-carriers being operated by levers having foot-pieces, the point of connection of the straps for moving the pawl-carriers with the said levers being quickly adjustable by means of the rider's feet on the said levers, whereby the leverage to be gained by the use of the levers may be increased or decreased at will, according to the condition of the road being traveled.

Figure 1 represents in side elevation a bicycle embodying my invention; Fig. 2, a top view of Fig. 1; Fig. 3, a sectional detail taken longitudinally through the hub of the main or front wheel, the bearings for its axle, and the pawl-and-ratchet mechanism to drive the said wheel. Fig. 4 is a section of Fig. 3 on the dotted line $x\,x$; Fig. 5, an end view of the axle, showing the ratchet, pawl, and pawl-carrier. Fig. 6 is a detail of the fork for the rear or steering wheel; and Figs. 7, 8, 9 represent certain modifications in details of the levers and means for regulating the power to be gained by them.

The rear wheel, $a$, by which the bicycle is to be steered, has its axle placed in bearings at the lower end of a yoke, $a^2$, the upper end, $a^3$, of which is fitted loosely in a suitable bearing, $a^4$, at the rear end of the backbone $b$, the latter being forked at its front end, as shown in Fig. 2, to form arms $b\,b'$ for the axle $c$ of the main or larger front wheel, $c^2$, of usual construction. The hub of the front wheel is fixed to the axle $c$, and the latter, extended loosely through the bearings forming part of or connected with the parts $b'$ of the backbone in any usual way, receives upon it loosely, outside each of the said portions $b'$, a pawl-carrier, $d$, having a pawl, $d^2$, which pawls $d^2$ engage the teeth of ratchets $e$, secured to the outer ends of the said axle $c$.

Each pawl-carrier $d$, made as a drum open at one end, is provided with a spring, $f$, connected therewith at one end, and at its other end with a stud, 2, of a quill forming part of the bearing or arm $b'$, as shown in Fig. 4. The springs $f$, one in each drum at each side of the wheel $c^2$, serve to restore the said drums to their normal positions after they have been turned forward by the straps $g$, each connected at one end with one of the drums and at its other end with a suitable hook of an endless chain, $h$, or it may be of a traveling nut, $l$, on a screw-shaft, $l^2$, as in Figs. 7 to 9, the said chains or screws forming parts of the levers or treadles $m$, having their fulcra at $m^2$ in the arms $b'$ of the backbone. Each strap $g$ passes over a pulley or sheave, $n$. Each treadle has a pivoted foot-piece, $o$, shown as having three faces. (See dotted lines, Fig. 1.) The feet of the rider are placed upon these foot-pieces, and after the levers $m$ are depressed by the rider to turn the pawl-carriers $d$ forward to operate the wheel $c^2$ they are lifted by the springs $f$. These foot-pieces are mounted loosely on short shafts extended through the forked outer ends of the levers $m$. These shafts each have fixed to them a serrated wheel, $r$, and also (see Fig. 2) a sprocket or chain wheel, over which the endless chain $h$ (shown in Figs. 1 and 2) is passed, each of the said chains also passing over a second sprocket or chain wheel, $s$, as in Fig. 1.

When it is desired to move the point of connection of the strap $g$ with the chain $h$ or its hook, so as to increase or decrease the length of that arm of the lever between the said strap and the free end of the lever, it is only necessary to place the foot on the wheel $r$ and turn it, thus causing the chain to travel in one or the other direction, and with it the lower end of the strap $g$.

The screw $l^2$, Figs. 7 to 9, if used, may be turned for the purpose through the bevel-gears shown in Fig. 8.

The fork $a^2$ has arms which are connected by chains $u$ or cords, or it may be links or levers, with arms $v$ of the steering shaft or spindle $w$, held in a bearing, $w^2$, of the backbone, and having a suitable handle or hand-piece, $x$.

The saddle $x^2$ has a back, $y$. The saddle will be of such height that the rider can touch his feet to the ground when starting, to thus walk and bring the machine to sustaining speed, after which he may sit in the saddle and with feet on the foot-pieces of the levers operate the machine, the legs moving only nearly vertically instead of in a circle, as when the foot is placed on a crank.

Instead of the pawl and ratchet, I may employ as equivalents any usual friction ratchet or device for converting reciprocating into rotary motion.

I do not broadly claim a loose pawl-carrying drum to actuate a bicycle-wheel, for if such drum actuated by foot-levers were applied to a front wheel which was swiveled in the backbone, so as to thereby steer the bicycle, the front wheel, when out of line with the backbone, would cut into the legs of the rider, and could not be practically moved by a lever and drum, as described by me.

I claim—

1. In a bicycle, the front wheel, the pawl-carrying drums and actuating-levers therefor, and backbone provided with a seat back of the front wheel, combined with the rear wheel, and its fork adapted to swivel in the backbone to steer the bicycle, substantially as described.

2. The front wheel, $c^2$, its shaft and rigid bearings therefor in the backbone, and the loose pawl-carrying drums and the ratchets, combined with the foot-levers having their fulcra on the backbone, and with belts to connect the said levers and pawl-carrying drums, and with means, substantially as described, to vary the point of connection of the said straps with the said levers, substantially as set forth.

3. The front wheel, $c^2$, its shaft and rigid bearings located near the front of the backbone, and the fixed ratchets and loose pawl-carriers and pawls, combined with straps and foot-levers having their fulcra on the backbone, whereby the said levers are made to move the drums in one direction, while a spring moves them in the opposite direction, substantially as described.

4. The front wheel, $c^2$, its ratchets, and shaft having bearings fixed to the backbone, and the pawl-carriers and straps, combined with the intermediate pulleys or sheaves, having their axes fixed to the said backbone near the shaft of the front wheel, and with the levers, and means, substantially as described, attached to the levers to change the effective points of connection of the said straps and levers, substantially as set forth.

5. In a bicycle, a backbone, a front wheel in fixed bearings thereon, ratchets, and pawl-carrying drums and straps, combined with foot-actuated levers having their fulcra on the backbone, in front of the bearings for the front wheel, and with strap-supporting sheaves located on the backbone at the rear of the axle of the front wheel, substantially as described.

In testimony whereof I have signed my name to this specification in the presence of two subscribing witnesses.

MOSES G. CRANE.

Witnesses:
G. W. GREGORY,
W. H. SIGSTON.